(12) United States Patent
Komiya

(10) Patent No.: US 7,800,353 B2
(45) Date of Patent: Sep. 21, 2010

(54) CONTROL UNIT, POWER SUPPLY DEVICE AND ELECTRONIC APPARATUS

(75) Inventor: Motoki Komiya, Hyogo (JP)

(73) Assignee: Fujitsu Ten Limited, Kobe-shi (JP)

( * ) Notice: Subject to any disclaimer, the term of this patent is extended or adjusted under 35 U.S.C. 154(b) by 615 days.

(21) Appl. No.: 11/896,259

(22) Filed: Aug. 30, 2007

(65) Prior Publication Data
US 2008/0055943 A1 Mar. 6, 2008

(30) Foreign Application Priority Data
Sep. 1, 2006 (JP) ............................ P2006-237429

(51) Int. Cl.
*G05F 1/40* (2006.01)
(52) U.S. Cl. ..................... 323/284; 323/290; 323/235
(58) Field of Classification Search ................ 323/235, 323/282–288, 290, 351
See application file for complete search history.

(56) References Cited
U.S. PATENT DOCUMENTS
6,201,382 B1 * 3/2001 Kusumoto et al. .......... 323/356
6,420,858 B1 * 7/2002 Kitagawa et al. ............ 323/282
7,576,529 B2 * 8/2009 Ishino ........................ 323/284
7,710,089 B2 * 5/2010 Kohout et al. ............... 323/273

FOREIGN PATENT DOCUMENTS
JP  A-07-046853  2/1995
JP  A-2001-258269  9/2001

* cited by examiner

*Primary Examiner*—Jessica Han
(74) *Attorney, Agent, or Firm*—Oliff & Berridge, PLC

(57) ABSTRACT

A power supply device has a first node to which an input voltage is input, a second node, a third node from which an output voltage is output, a first switching circuit electrically connecting the first node and the second node and a resonance circuit electrically connecting the second node and the third node. The power supply device converts the input voltage into the output voltage through an intermediate voltage of the second node. A first timing circuit is operable to turn on and turn off the first switching circuit. When the intermediate voltage becomes equal to or larger than a first predetermined voltage, the first timing circuit turns on the first switching circuit after a first predetermined time period.

17 Claims, 10 Drawing Sheets

| V26 | V37 | V48 | V38 |
|-----|-----|-----|-----|
| H | H | H | H |
| L | H | H | H |
| H | L | H | H |
| L | L | H | L |
| H | H | L | L |
| L | H | L | L |
| H | L | L | L |
| L | L | L | L |

CONTROL UNIT, POWER SUPPLY DEVICE AND ELECTRONIC APPARATUS

The disclosure of Japanese Patent Application No. 2006-237429 filed on Sep. 1, 2006 including specification, drawings and claims is incorporated herein by reference in its entirety.

BACKGROUND

The present invention relates to a control unit, a power supply device and an electronic apparatus, and in particular, to a power supply device having a converter that converts a voltage by switching, a control unit for controlling the power supply device, and an electronic apparatus.

A DC-DC converter is used as a power supply device for obtaining a desired DC voltage from a DC power supply. There is a natural commutation type converter as the DC-DC converter. FIG. 1 is a circuit diagram illustrating a related-art step-down and natural commutation type converter, and FIG. 2 is a timing chart of the converter. Referring to FIG. 1, an FET 12 that is a switching circuit is connected between an input node Nin, to which a power supply voltage VB is applied, and an intermediate node N1. A diode 13 and a capacitor C2 are connected in parallel between the intermediate node N1 and a ground. An inductor L1 is connected between the intermediate node N1 and an output node Nout, and an electrolytic capacitor C1 is connected between the output node Nout and the ground.

Referring to FIG. 2, until time T1, the FET 12 is in an ON state and an intermediate voltage Vx at the intermediate node N1 is approximately the power supply voltage VB. During this period, an inductor current IL flowing through the inductor L1 in the direction from the intermediate node N1 to the output node Nout increases. When the FET 12 is turned off at time T1, the intermediate voltage Vx changes to a turn-on voltage of the diode 13 in the forward direction thereof. The inductor current IL decreases and becomes 0 at time T2. After time T2, electric charges accumulated in the electrolytic capacitor C1 flow through the inductor L1 from the output node Nout to the intermediate node N1, such that the negative inductor current IL flows. As a result, electric charges are accumulated in the capacitor C2, and the intermediate voltage Vx increases. Thus, the inductor current IL and the intermediate voltage Vx resonate. At time T3, when the intermediate voltage Vx reaches the power supply voltage VB, the FET 12 is turned on. That is, a zero voltage switching is performed. As a result, the inductor current IL flows again in the direction from the intermediate node N1 to the output node Nout. Thus, since the FET 12 is repeatedly turned on and off, the intermediate voltage Vx repeats between the power supply voltage VB and the turn-on voltage of the diode 13. The output voltage Vout becomes a DC voltage by a smoothing circuit including the inductor L1 and the electrolytic capacitor C1. Thus, the DC power supply voltage VB is converted into the DC output voltage Vout. In addition, when the FET 12 is turned on, a difference of electric potentials at both ends of the FET 12 is 0 (zero voltage switching). Accordingly, a power loss occurring due to switching can be suppressed.

Patent Document 1 discloses that a dead time is applied at the time of ON/OFF switching in order to make a switching frequency constant. Patent Document 2 discloses a method of adjusting a dead time that is a time at which both elements are turned off at the time of a soft switching operation, in order to adjust a dead time period.

Patent Document 1: Japanese Patent Publication No. 7-46853A

Patent Document 2: Japanese Patent Publication No. 2001-258269A

For example, in the step-down converter shown in FIG. 1, the intermediate voltage Vx does not reach the power supply voltage VB in a resonating state between time T2 and time T3 (refer to FIG. 2) if the output voltage Vout is equal to or smaller than ½ of the power supply voltage VB. In this case, the difference of electric potentials between both ends of the FET 12 does not become 0, and accordingly, the zero voltage switching cannot be performed. Thus, if the zero voltage switching cannot be performed, the power loss increases.

SUMMARY

It is therefore an object of the invention to provide a control unit capable of suppressing a power loss occurring due to switching by performing a zero current switching, a power supply device, and an electronic apparatus.

In order to achieve the above objects, according to an aspect of the invention, there is provided a In order to achieve the above objects, according to an aspect of the invention, there is provided a control unit operable to control a power supply device that includes a first node to which an input voltage is input, a second node, a third node from which an output voltage is output, a first switching circuit electrically connecting the first node and the second node and a resonance circuit electrically connecting the second node and the third node and that converts the input voltage into the output voltage through an intermediate voltage of the second node, the control unit comprising: a first timing circuit operable to turn on and turn off the first switching circuit, wherein when the intermediate voltage becomes equal to or larger than a first predetermined voltage, the first timing circuit turns on the first switching circuit after a first predetermined time period. With this configuration, it is possible to suppress a power loss occurring due to switching of the power supply device by performing a zero current switching.

The first switching circuit may include a field effect transistor; and the first timing circuit may be electrically connected to a gate of the field effect transistor.

The resonance circuit may be includes an inductor and a capacitor.

The first predetermined voltage may be any one of the output voltage, the input voltage, and a ground voltage.

The predetermined time period may be a time corresponding to (N+¼) times resonance period of the resonance circuit (where N is 0 or positive integer).

When the output voltage is smaller than a second predetermined voltage and the intermediate voltage becomes equal to or larger than the first predetermined voltage, the first timing circuit may turn on the first switching circuit after the first predetermined time period. With this configuration, since the first switching circuit is not turned on when an output voltage is too high even if the intermediate voltage becomes equal to or larger than the first predetermined voltage, it is possible to prevent an output voltage from further increasing.

When the intermediate voltage does not become equal to or larger than the first predetermined voltage for a second predetermined time period, the first timing circuit may turn on the first switching circuit. With this configuration, it is possible to prevent the power supply device from stopping even when the intermediate voltage does not become the first predetermined voltage for some reason.

When a current flowing through the first switching circuit becomes equal to or larger than a predetermined current, the first timing circuit may turn off the first switching circuit.

With this configuration, it is possible to prevent the first switching circuit and the like from being damaged by turning off the first switching circuit in the case when an excess current flows through the first switching circuit.

The first timing circuit may adjust the first predetermined time period in response to an ON/OFF period of the first switching circuit. With this configuration, the ON/OFF period of the first switching circuit can be adjusted.

The first timing circuit may shorten the first predetermined time period when the ON/OFF period of the first switching circuit is longer than a reference period; and the first timing circuit may elongate the first predetermined time period when the ON/OFF period of the first switching circuit is shorter than the reference period. With this configuration, it is possible to set the ON/OFF switching period within a fixed range. As a result, a power loss can be suppressed even in the case of a low load.

The power supply device may further include a second switching circuit electrically connecting the second node and a ground; the control unit may further comprise a second timing circuit operable to turn on and turn off the second switching circuit; and when the intermediate voltage is equal to or smaller than a third predetermined voltage, the second timing circuit may turn on the second switching circuit. With this configuration, since it is possible to inhibit a current from flowing from a ground to the intermediate node, a power loss can be suppressed.

When the first switching circuit is turned on for a third predetermined time period and the intermediate voltage is equal to or smaller than the third predetermined voltage, the second timing circuit may turn on the second switching circuit. With this configuration, in a case where the intermediate voltage is a high voltage for a short period of time, the second switching circuit is not turned on. As a result, a malfunction can be suppressed.

The second timing circuit may determine a time period for which the second switching circuit is turned on in response to a time period for which the first switching circuit is turned on. With this configuration, in a case where the first switching circuit is in the ON state for a short time, it is possible to suppress a power loss occurring due to a current flowing through the second switching circuit.

The second timing circuit may determine a time period for which the second switching circuit is turned on in response to the input voltage. With this configuration, when the first switching circuit is in the ON state for a long time, the time for which the second switching is in the ON state is increased. Thus, it is possible to suppress a power loss occurring due to a current flowing through the second switching circuit.

According to another aspect of the invention, there is provided a power supply device, comprising:
 a first node to which an input voltage is input;
 a second node;
 a third node from which an output voltage is output;
 a first switching circuit electrically connecting the first node and the second node;
 a resonance circuit electrically connecting the second node and the third node; and
 the control unit including a first circuit operable to turn on and turn off the first switching circuit, wherein:
 the power supply device operable to convert the input voltage into the output voltage through an intermediate voltage of the second node; and
 when the intermediate voltage becomes equal to or larger than a first predetermined voltage, the first timing circuit turns on the first switching circuit after a first predetermined time period.

According to a further aspect of the invention, there is provided an electronic apparatus, comprising:
 an electronic circuit; and
 the above described power supply device that supplies power to the electronic circuit.

According to a still further aspect of the invention, there is provided a method for controlling a power supply device that includes a first node to which an input voltage is input, a second node, a third node from which an output voltage is output, a switching circuit electrically connecting the first node and the second node and a resonance circuit electrically connecting the second node and the third node, and that converts the input voltage into the output voltage through an intermediate voltage of the second node, the method comprising:
 determining whether the intermediate voltage becomes equal to or lager than a predetermined voltage;
 turning on the switching circuit after a predetermined time period when the intermediate voltage becomes equal to or larger than the predetermined voltage.

With the above configurations, it is possible to provide a control unit, a power supply device and an electronic apparatus which are capable of suppressing the power loss occurring due to switching by performing the zero current switching.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE EMBODIMENTS

Hereinafter, embodiments of the invention will be described in detail with reference to the accompanying drawings.

First Embodiment

Figure 3:
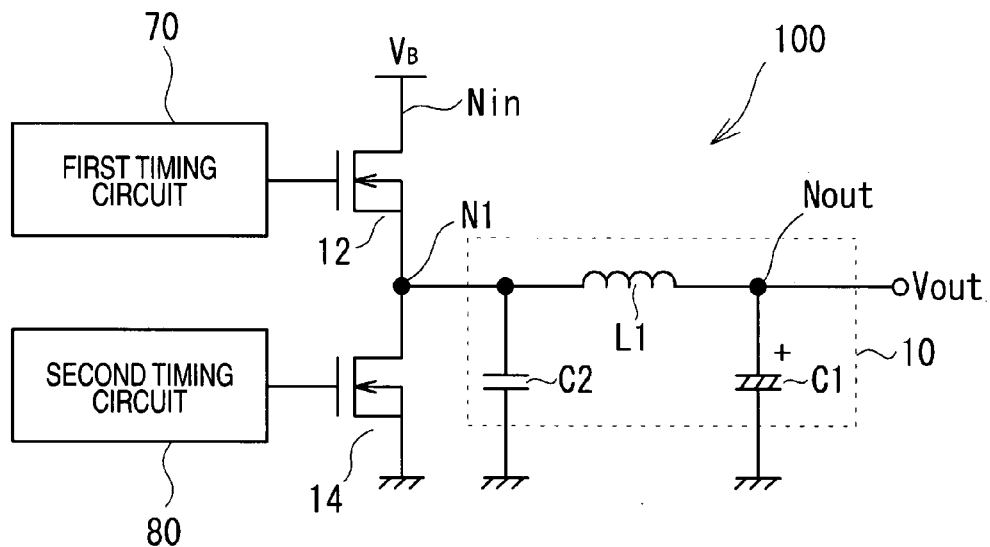
FIG. 3 is a block diagram illustrating a converter according to a first embodiment of the present invention.

In a first embodiment, an example of a step-down converter (power supply device) will be described. FIG. 3 is a block diagram illustrating a power supply device (converter) 100 according to the first embodiment. The power supply device 100 includes an FET 12 (first switching circuit), an FET 14 (second switching circuit), a resonance circuit 10, and a first timing circuit 70 and a second timing circuit 80 that form a control unit. The FET 12 is connected between an input node Nin, to which a power supply voltage VB (input voltage) is input, and an intermediate node N1. The FET 14 is connected between the intermediate node N1 and a ground. The resonance circuit 10 has capacitors C1 and C2 and an inductor L1. The capacitor C1 is connected between an output node Nout and the ground. The capacitor C2 is connected between the intermediate node N1 and the ground. The inductor L1 is connected between the intermediate node N1 and the output node Nout. The resonance circuit 10 is a circuit that causes an inductor current IL flowing through the inductor L1 and an intermediate voltage Vx at the intermediate node N1 to resonate. In addition, the inductor L1 and the capacitor C1 of the resonance circuit 10 smooth the intermediate voltage Vx and output an output voltage Vout from the output node N1.

The first timing circuit 70 is connected to a gate of the FET 12, and the second timing circuit 80 is connected to a gate of the FET 14. The first timing circuit 70 is a circuit that controls timing for turning on or off the FET 12, and the second timing circuit 80 is a circuit that controls timing for turning on or off the FET 14. Thus, the first timing circuit 70 and the second timing circuit 80 form a control unit which controls the power supply device 100.

Figure 1:
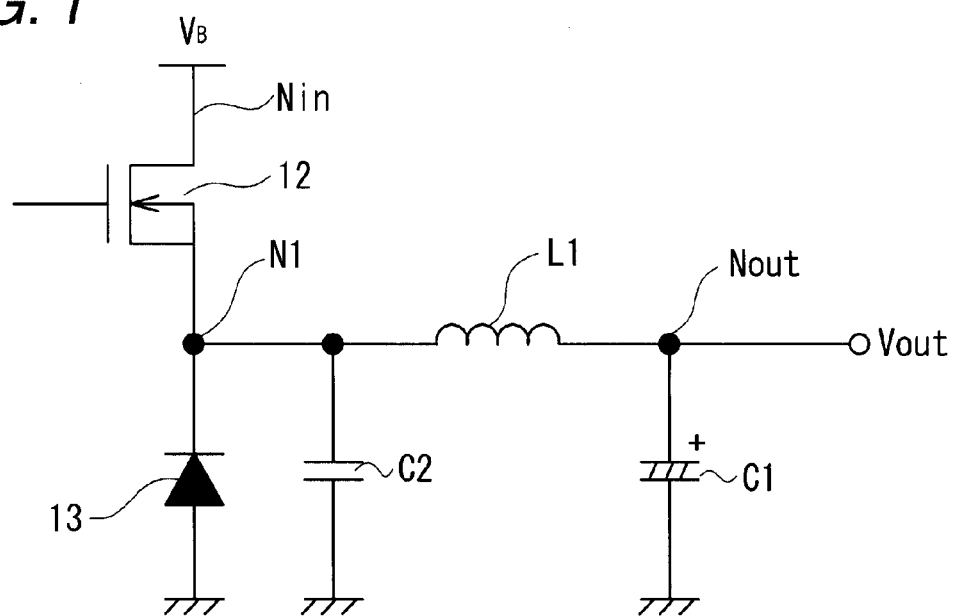
FIG. 1 is a circuit diagram illustrating a related-art converter.
Figure 2:
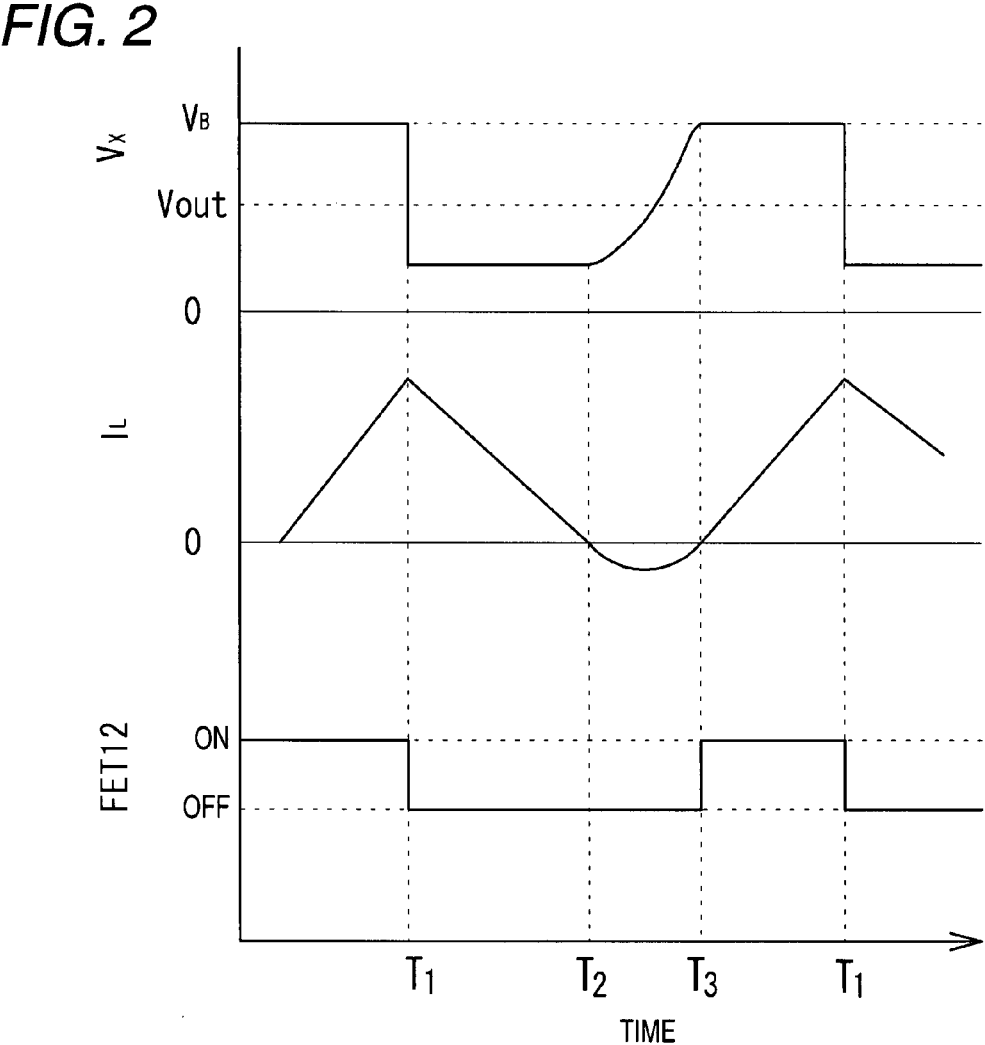
FIG. 2 is a timing chart of the related-art converter.
Figure 4:
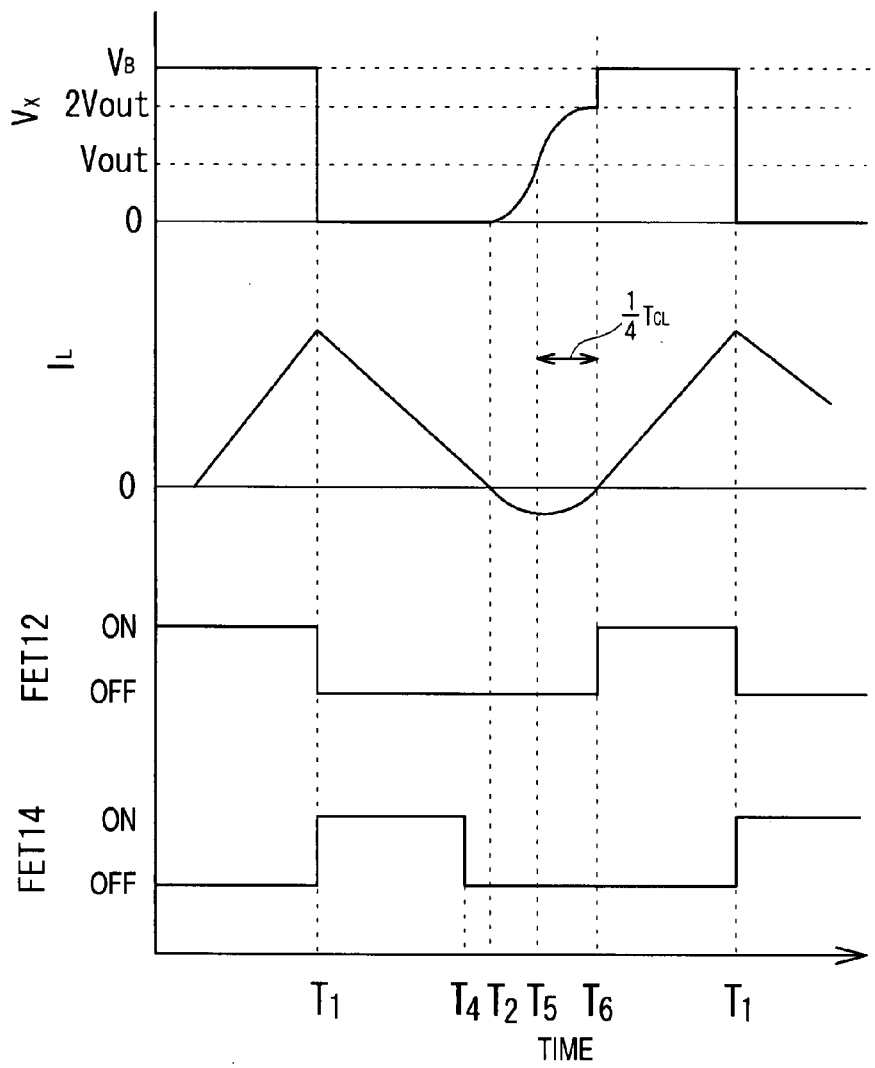
FIG. 4 is a timing chart of the converter according to the first embodiment.

FIG. 4 is a timing chart of the power supply device 100. Until time T1, the FET 12 is in an ON state, the FET 14 is in an OFF state, and the intermediate voltage Vx at the intermediate node N1 is approximately the supply voltage VB. During this period, the inductor current IL flowing through the inductor L1 in the direction from the intermediate node N1 to the output node Nout increases. At time T1, the first timing circuit 70 makes the FET 12 turned off and the second timing circuit 80 makes the FET 14 turned on. As a result, the intermediate voltage Vx becomes about 0 V. Thus, comparing with a case in which the intermediate voltage Vx becomes a turn-on voltage of the diode 13 in the forward direction thereof as shown in FIG. 1, a power loss can be suppressed. The inductor current IL decreases during a period of time T1 to time T2 and becomes 0 at time T2. The second timing circuit 80 makes the FET 14 turned off at time T4 before reaching time T2. After time T2, the inductor current IL (that is, a negative current) flows through the inductor L1 from the output node Nout to the intermediate node N1 due to electric charges accumulated in the capacitor C1 and electric charges are accumulated in the capacitor C2, and accordingly, the intermediate voltage Vx increases. Thus, the inductor current IL and the intermediate voltage Vx resonate. At time T5, the intermediate voltage Vx becomes the output voltage Vout. At this time, the inductor current IL is the smallest. The first timing circuit 70 turns on the FET 12 at time T6 (the inductor current IL at this time is 0). That is, a zero current switching is performed. Here, time T6 corresponds to a time at which time (¼ TCL) corresponding to ¼ of a period TCL of a resonance frequency has passed from time T5. As a result, the inductor current IL flows again in the direction from the intermediate node N1 to the output node Nout. Thus, since the FET 12 is repeatedly turned on and off, the intermediate voltage Vx repeats between the power supply voltage VB and the ground. The output voltage Vout becomes a DC voltage by a smoothing circuit including the inductor L1 and the capacitor C1.

According to the first embodiment, the first timing circuit 70 compares the intermediate voltage Vx with a first predetermined voltage (for example, the output voltage Vout), and makes the FET 12 turned on after a predetermined time (T6-T5) if the intermediate voltage Vx becomes the first predetermined voltage or more. Here, the predetermined time (T6-T5) is a time equivalent to ¼ of a resonance period of the resonance circuit 10. This makes it possible to perform the zero current switching. Consequently, it is possible to suppress a power loss, for example, even in the case in which the output voltage Vout is ½ or less of the power supply voltage VB and the zero voltage switching cannot be performed. Although the first predetermined voltage is explained as the output voltage Vout in the first embodiment, a voltage which may be set as the first predetermined voltage is not limited to the embodiment. For example, the input voltage Vin or a ground voltage may be the first predetermined voltage.

Figure 5:
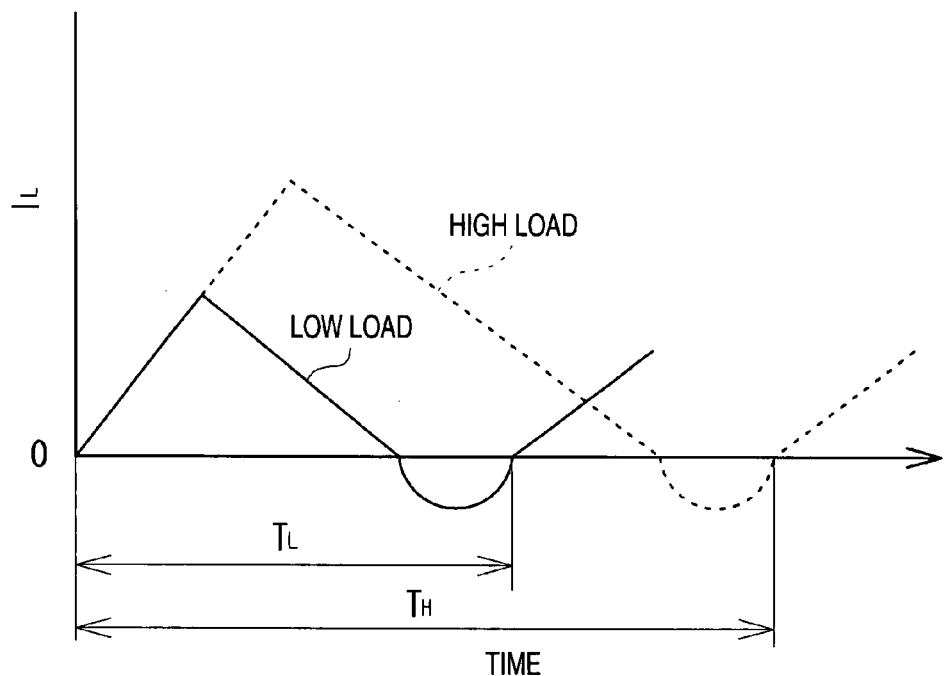
FIG. 5 is a view illustrating a switching period corresponding to a load of the related-art converter.

FIG. 5 is a view for explaining a problem in the related-art converter shown in FIG. 1. In a case where a high load is connected to an output of a converter, a large current is required as the inductor current IL. Accordingly, as shown by a dotted line of FIG. 5, an ON/OFF period TH is long. On the other hand, in the case of a low load, a small current is required as the inductor current IL. Accordingly, as shown by a solid line of FIG. 5, an ON/OFF period TL is short. For this reason, a switching frequency increases at the time of the low load, and as a result, a power loss of a converter increases.

Figure 6:
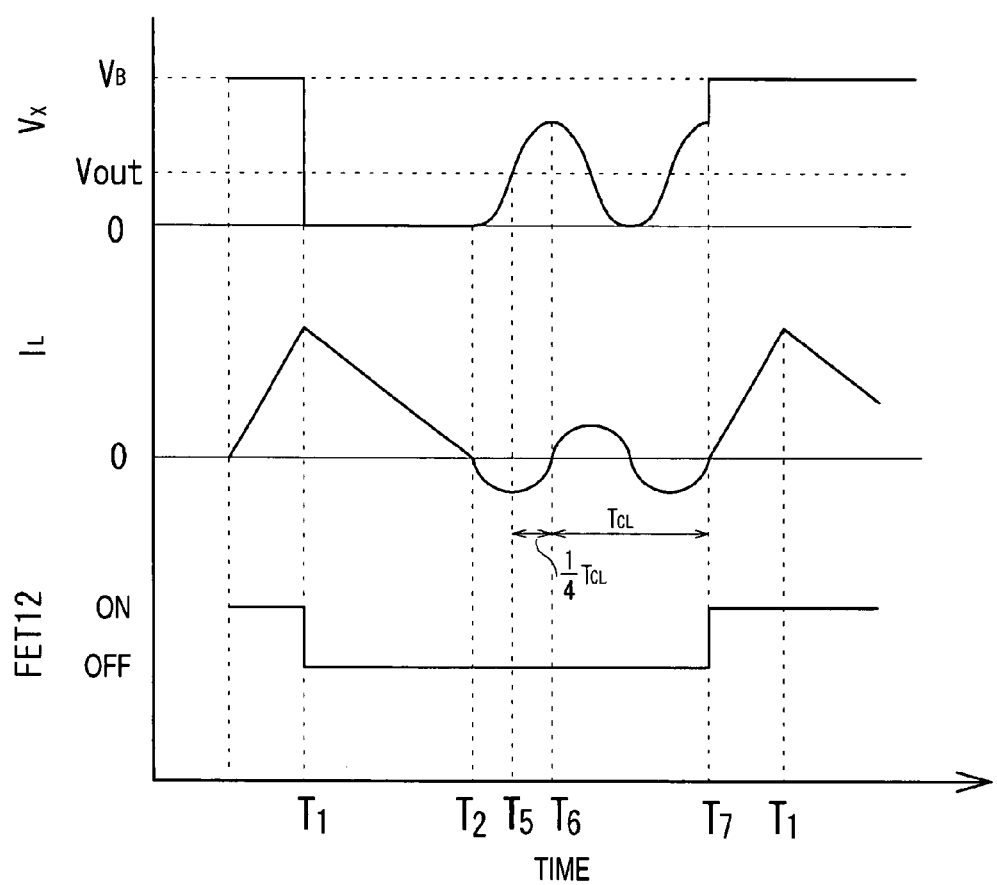
FIG. 6 is a timing chart of the converter according to the first embodiment.

FIG. 6 is a timing chart of the power supply device 100 in a case where a predetermined time (T7-T5) is set as a time obtained by adding integral multiples of a resonance period to a time corresponding to ¼ of a resonance period TCL of the resonance circuit 10. The first timing circuit 70 turns on the FET 12 at time T7 after time corresponding to a (1+¼) period of the resonance circuit 10 has passed from time T5 at which the intermediate voltage Vx became the output voltage Vout. In this way, it is possible to make an ON/OFF switching period long while performing the zero current switching. As a result, the power loss of a converter can be suppressed even in the case of a low load.

Second Embodiment

Figure 7:
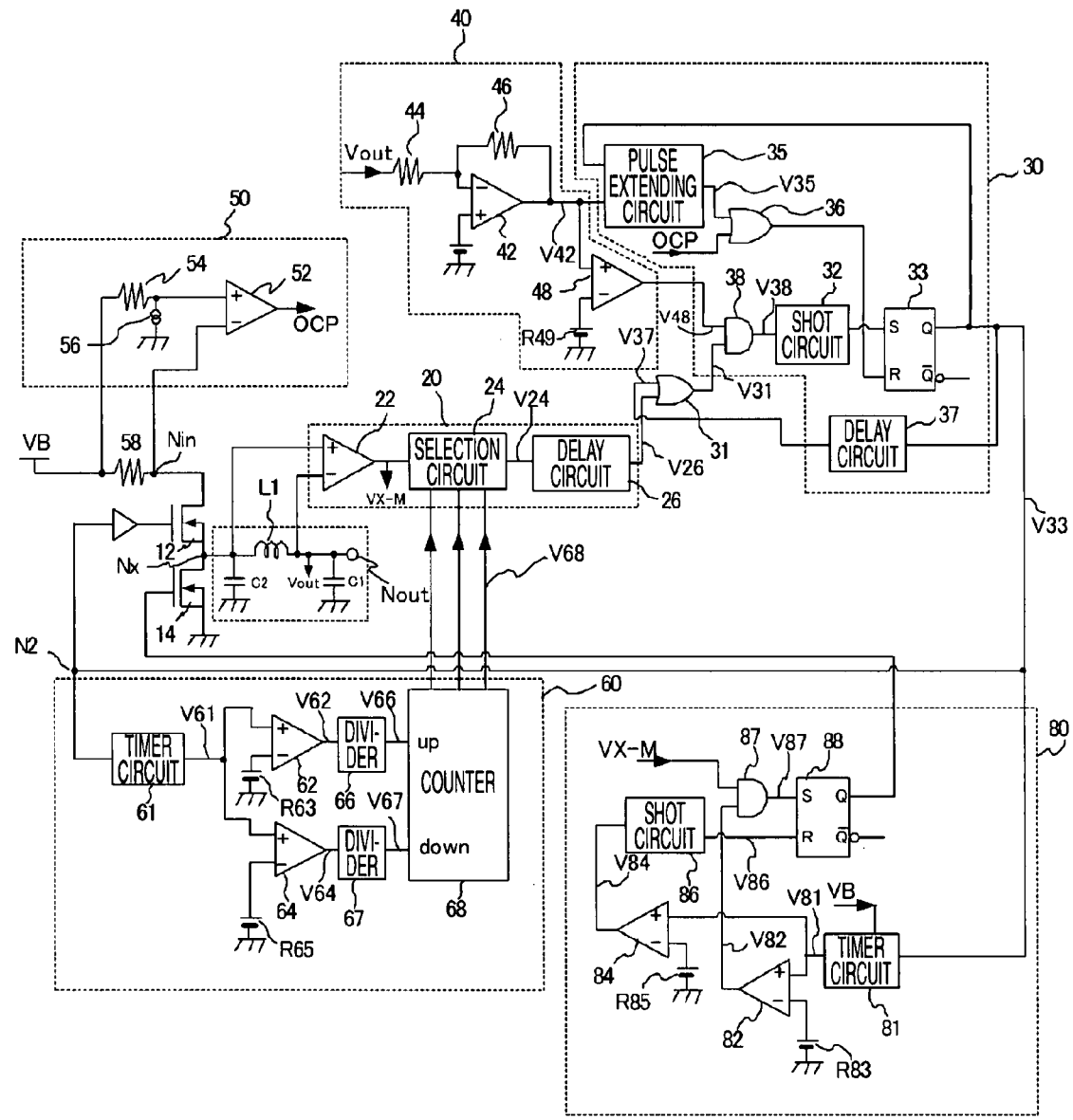
FIG. 7 is a block diagram illustrating a converter according to a second embodiment of the present invention.
Figures 8, 9:
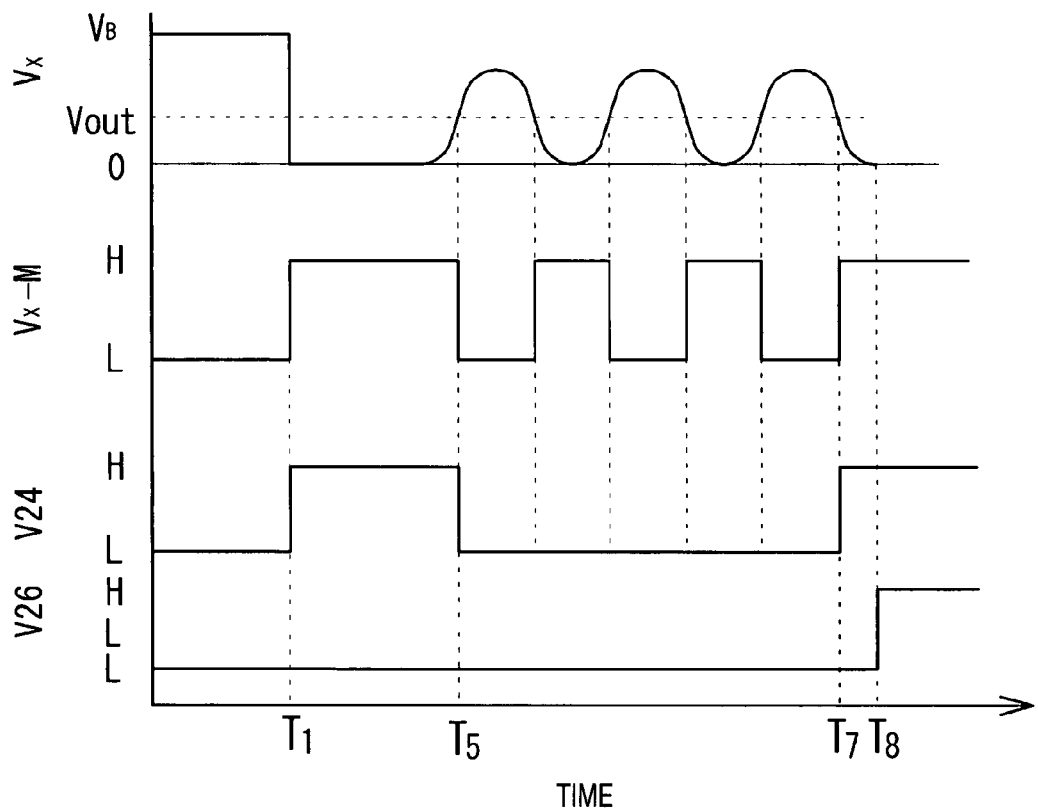
FIG. 8 is a timing chart of an output voltage detection circuit in the second embodiment.
FIG. 9 is a truth table of an OR circuit 31 and an AND circuit 38 according to the second embodiment.

In a second embodiment, an example in which other functions are added in the first timing circuit 70 and the second timing circuit 80 that form the control unit of the power supply device is proposed. Referring to FIG. 7, a first timing circuit includes a voltage comparator circuit 20, a switch control circuit 30, an output voltage detection circuit 40, a power supply current detection circuit 50, and a period detection circuit 60. The voltage comparator circuit 20 has a comparator 22, a selection circuit 24, and a delay circuit 26. Referring to FIG. 8, the comparator 22 compares the intermediate voltage Vx with the output voltage Vout and outputs, as 'Vx−M', a low level if the intermediate voltage Vx is equal to or larger than the output voltage Vout and a high level if the intermediate voltage Vx is smaller than the output voltage Vout. The selection circuit 24 outputs a high level when the number of times of a high level of 'Vx-M' after time T5 becomes the number of times instructed by an output V68 from the period detection circuit 60. In FIG. 8, the selection circuit 24 outputs a high level at a third high level of 'Vx-M'. The selection circuit 24 is a divider, for example. In the case of outputting a high level at an n-th high level of 'Vx-M', the selection circuit 24 is a 1/n divider. The delay circuit 26 delays an output V24 of the selection circuit 24 by a ¼ period of the resonance circuit 10 and outputs an output V26.

Referring to FIG. 7, the output V26 is input to an OR circuit 31 of the switch control circuit 30. FIG. 9 is a truth table of an output V38 of an AND circuit 38 when the output V26 of the delay circuit 26, an output V37 of the delay circuit 37, and an output V48 of a comparator 48 are input to the OR circuit 31 and the AND circuit 38. When the output V26 changes to a high level, the output V38 of the AND circuit 38 changes to a high level if the output V48 is in a high level. Referring to FIG. 7, a shot circuit 32 outputs a high-level pulse if an input is in a high level. Accordingly, when the output V48 changes to a high level, a high-level pulse is input to a set S of a flip-flop 33. In this case, an output V33 of the flip-flop 33 is input in a high level. An output of the first timing circuit 70 is connected to a node N2 and connected to the FET 12. As a result, the FET 12 is turned on and holds this ON state.

Thus, when the intermediate voltage Vx becomes equal to or larger than the output voltage Vout, the first timing circuit 70 can turn on the FET 12 after a time obtained by adding integral multiples of a resonance period to a time corresponding to ¼ of the resonance period of the resonance circuit 10.

Referring to FIG. 7, the output detection circuit 40 inverts and amplifies the output voltage Vout using an amplifier 42 and resistors 44 and 46 and outputs an output V42. The comparator 48 compares the output V42 with a reference voltage R49 and outputs a low level to the AND circuit 38 as the voltage V48 if the output V42 is equal to or smaller than the reference voltage R49 (that is, if the output V42 is equal to or larger than a second predetermined voltage corresponding to the reference voltage R49). Referring to FIG. 9, when the voltage V48 changes to a low level, the voltage 38 changes to a low level regardless of voltages V26 and V37. As a result, the flip-flop 33 is not set but the FET 12 is turned off. Thus, in the case when the output voltage Vout is equal to or larger than the second predetermined voltage corresponding to the reference voltage R49, the first timing circuit 70 does not turn on the FET 12 first switching circuit) even if the intermediate voltage Vx becomes equal to or larger than the output voltage Vout. In a case where the output voltage Vout is too high, it is possible to prevent the output voltage Vout from further increasing without turning on the FET 12 by setting the second predetermined voltage corresponding to the reference voltage R49 to an upper-limit target voltage of the output voltage Vout.

The delay circuit 37 delays a voltage of the output V33 by a predetermined period of time and outputs the delayed voltage to the OR circuit 31 as the voltage V37. Referring to FIG. 9, when the output V37 changes to a high level, the output V38 of the AND circuit 38 changes to a high level regardless of the output V26 if the output V48 is in a high level. Thus, in the case when the intermediate voltage Vx does not become the output voltage Vout (first predetermined voltage) for a predetermined period of time, the first timing circuit 70 can turn on the FET 12 (first switching circuit) even if the intermediate voltage Vx does not become the output voltage Vout. As a result, it is possible to prevent a converter from stopping even when the intermediate voltage Vx does not become the output voltage Vout for some reason.

When the output V33 of the flip-flop 33 changes to a high level, a pulse extending circuit 35 outputs a high level as an output V35 after an extension period has passed. The output V42 of the amplifier 42 is input to the pulse extending circuit 35. The pulse extending circuit 35 changes a pulse extension time in accordance with the output V42. That is, the pulse extending circuit 35 makes the extension time short when the output voltage Vout is high and makes the extension time long when the output voltage Vout is low. The output V35 is input to an OR circuit 36. When the output V35 changes to a high level, the OR circuit 36 outputs a high level, as an output V36, to a reset R of the flip-flop 33. As a result, the output V33 of the flip-flop 33 is set to a low level, which turns off the FET 12. Thus, the first timing circuit 70 decides a period, for which the FET 12 (first switching circuit) is in an ON state, corresponding to the output voltage Vout. This makes the output voltage Vout fed back such that the output voltage Vout becomes constant.

Referring to FIG. 7, the current detection circuit 50 includes a comparator 52, a resistor 54, and a constant current source 56. A resistor 58 is provided between the FET 12 and the power supply VB. The comparator 52 compares a voltage applied between both sides of the resistor 58 with a voltage obtained by converting a current of the constant current source 56 by means of the resistor 54. When a current (current flowing through the FET 12) flowing through the resistor 58 becomes larger than a predetermined current, the comparator 52 outputs a high level to an output OCP. The output OCP is input to the OR circuit 36. When the output OCP changes to a high level, a high level is input to the reset R of the flip-flop 33. As a result, the output V33 of the flip-flop 33 is set to a low level, which turns off the FET 12. Thus, when a current flowing through the FET 12 (first switching circuit) becomes a predetermined current or more, the first timing circuit 70 turns off the FET 12. For this reason, it is possible to prevent the FET 12 and the like from being damaged by turning off the FET 12 in the case when an excess current flows through the FET 12.

Figure 10:
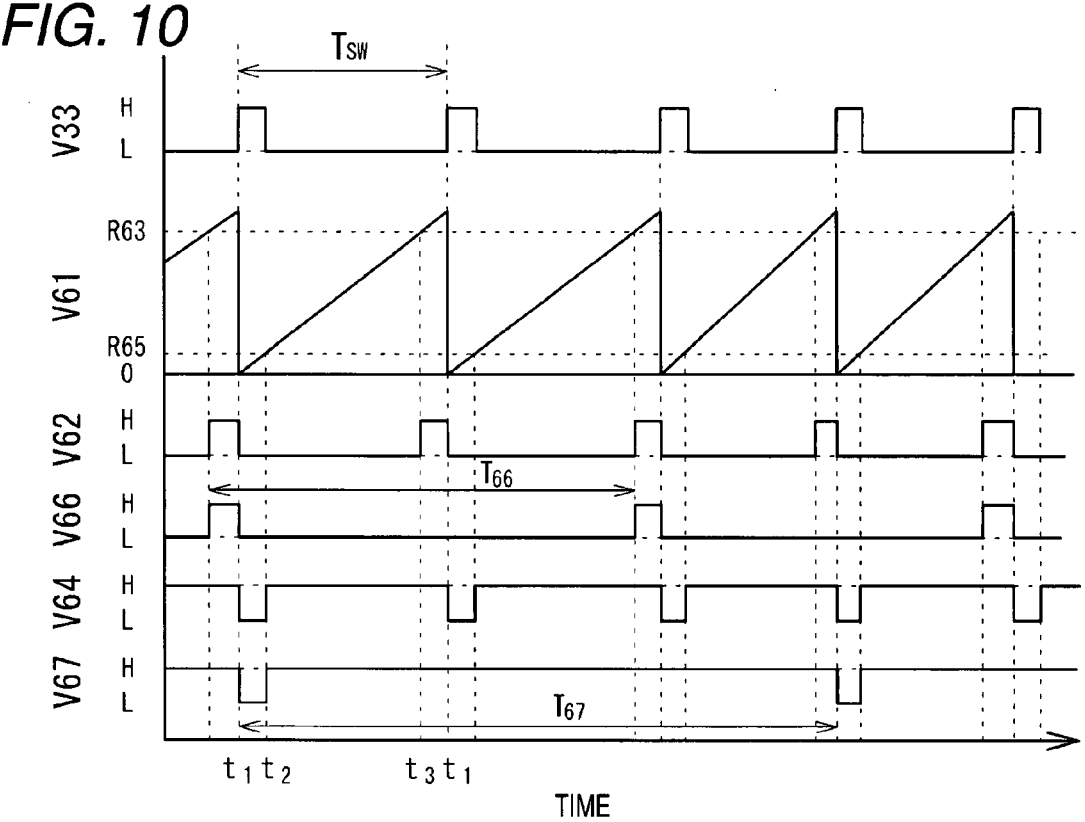
FIG. 10 is a timing chart of a period detection circuit according to the second embodiment.

Referring to FIG. 7, the period detection circuit 60 includes a timer circuit 61, a comparator 62, a comparator 64, a divider 66, a divider 67, and a counter 68. Referring to FIGS. 7 and 10, the output V33 of the flip-flop 33 is input to the timer circuit 61. The timer circuit 61 converts a time after the output V33 becomes a high level into a current and outputs an output V61. That is, when the output V33 changes from a low level to a high level at time t1, the output V61 becomes 0 and then the output V61 uniformly increases with time. When the output V33 changes from a low level to a high level again, the output V61 becomes 0. The comparator 62 compares the output V61 with a reference voltage R63 and the comparator 64 compares the output V61 with a reference voltage R65. If the output V61 of the timer circuit 61 is larger than the reference voltage R63, the comparator 62 outputs a high level as an output V62. The output V62 is in a low level from time t1 to time t3 and in a high level from time t3 to time t1. Similarly, if the output V61 is larger than the reference voltage R65, the comparator 64 outputs a high level as an output V64. The output V64 is in a low level from time t1 to time t2 and in a high level from time t2 to time t1.

The divider 66 divides a period of the output V62 into ½ of the period, for example. Accordingly, a period T66 of an output V66 of the divider 66 becomes twice a switching period Tsw. That is, a pulse is input to an 'Up' of the counter 68 in two periods of Tsw. On the other hand, the divider 67 divides a period of an output V63 into ⅓ of the period, for example. Accordingly, a period T67 of an output V67 of the divider 67 becomes three times the switching period Tsw. That is, a pulse is input to a 'Down' of the counter 68 in three periods of Tsw. The counter 68 performs a count-up operation when a high level is input to the 'Up' and a count-down operation when a low level is input to the 'Down'. A count value is output as a 3-bit output V68 to the selection circuit 24. The selection circuit 24 adjusts a period, for which the FET 12 is in an ON state, according to the output V68 as described above. In FIG. 10, since T66 is shorter than T67, a count-up operation is performed.

As shown in FIG. 10, when a maximum voltage of the output V61 is larger than the reference voltage R63, that is, when the switching period Tsw is longer than a time (reference period) corresponding to the reference voltage R63, a count-up operation is performed by the counter 68. Accordingly, when the intermediate voltage Vx becomes equal to or larger than the output voltage Vout, a predetermined period until the FET 12 is turned on increases.

Figure 11:
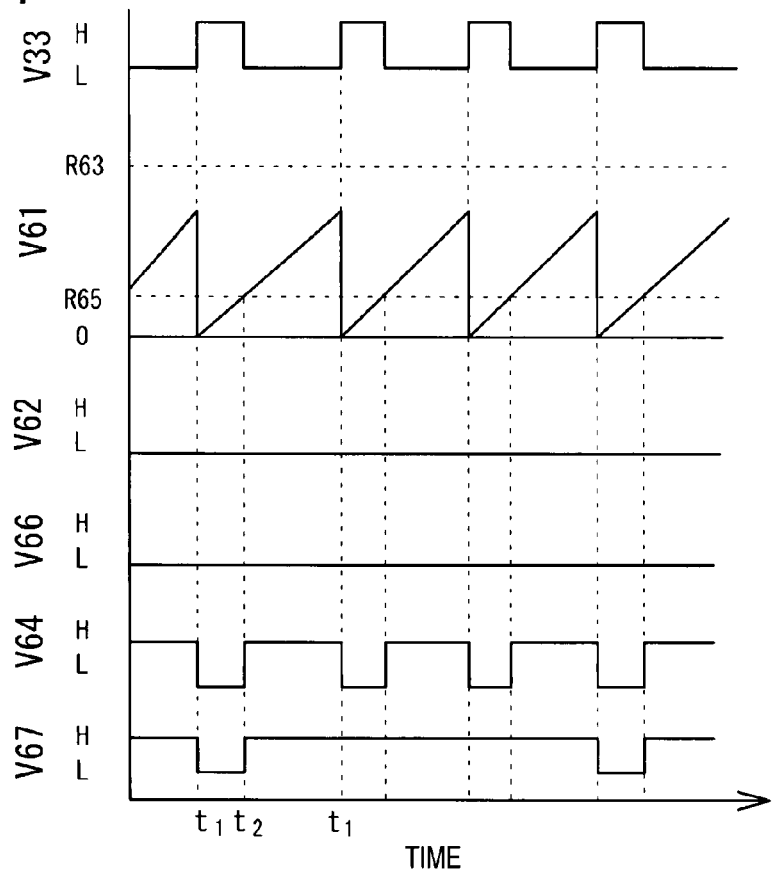
FIG. 11 is a timing chart of the period detection circuit according to the second embodiment.

On the other hand, as shown in FIG. 11, when a maximum voltage of the output V61 is smaller than the reference voltage R63, that is, when the switching period Tsw is longer than a time (reference period) corresponding to the reference voltage R63, the output V62 holds a low level. As a result, a count-down operation is performed by the counter 68. Thus, when the intermediate voltage Vx becomes equal to or larger than the output voltage Vout, a predetermined period until the FET 12 is turned on decreases.

As described above, when the intermediate voltage Vx becomes equal to or larger than the output voltage Vout, the first timing circuit 70 adjusts a predetermined period until the FET 12 is turned in correspondence with an ON/OFF period of the FET 12 first switching circuit). This makes it possible to adjust the ON/OFF period of the FET 12. Further, the first timing circuit 70 makes the predetermined period short if the ON/OFF period of the FET 12 is longer than a reference period and makes the predetermined period long if the ON/OFF period is shorter than the reference period. Accordingly, it is possible to set an ON/OFF switching period within a fixed range. As a result, a power loss of a converter can be suppressed even in the case of a low load.

An operation of the second timing circuit 80 will be described. Referring to FIG. 7, the second timing circuit 80 includes a timer circuit 81, a comparator 82, a comparator 84, a shot circuit 86, an AND circuit 87, and a flip-flop 88. When 'Vx–M' changes to a high level, that is, when the intermediate voltage Vx becomes equal to or smaller than the output voltage Vout (third predetermined voltage), the AND circuit 87 outputs a high level to a set S of the flip-flop 88 if an output V87 is in a high level. Accordingly, the flip-flop 88 outputs a high level to a gate of the FET 14, which turns on the FET 14. Thus, the second timing circuit 80 turns on the FET 14 when the intermediate voltage Vx is equal to or smaller than the output voltage Vout (third predetermined voltage). For this reason, the FET 14 can be turned on at a time when the intermediate voltage Vx becomes about 0 V, like time T1 shown in FIG. 4. Consequently, since it is possible to inhibit a current from flowing from a ground to the intermediate node N1, a power loss can be suppressed. In addition, the third predetermined voltage can be set to a value that is lower than the power supply voltage VB and higher than 0 V.

Figure 12:
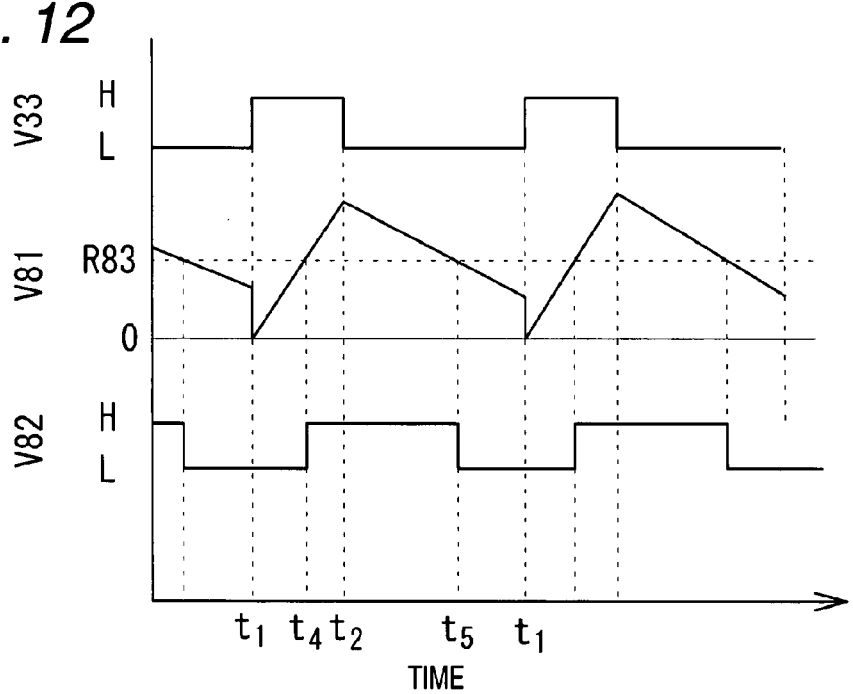
FIG. 12 is a timing chart of a second timing circuit according to the second embodiment.

Referring to FIG. 7, the output V33 of the flip-flop 33 is input to the timer circuit 81. FIG. 12 is a timing chart of the second timing circuit 80. Referring to FIGS. 7 and 12, the output V81 outputs an output V81 that uniformly increases from time t1 at which the output V33 changes to a high level to time t2 at which the output V33 changes to a low level. From time t2 to time t1, the output V81 that uniformly decreases is output. The comparator 82 compares the output V81 with a reference voltage R83. If the output V81 of the timer circuit 81 is equal to or larger than the reference voltage R83, the comparator 82 outputs a high level as an output V82. Referring to FIG. 12, a high level is output between time t4 and time t5. That is, if a time (t2-t1) for which the FET 12 is in an ON state is longer than a time (t4-t1) corresponding to the reference voltage R83, the comparator 82 outputs a high level, as the output V82, to the AND circuit 87. If the time for which the FET 12 is in an ON state is shorter than the time (t4-t1), the output V82 holds a low level. Therefore, even if 'Vx–M' changes from a low level to a high level, the output V87 of the AND circuit 87 does not change to a high level. Thus, in the case when the FET1 (first switching circuit) is in an ON state for a predetermined period of time, the second timing circuit 80 turns on the FET 14 (second switching circuit) if the intermediate voltage Vx is equal to or smaller than the output voltage Vout (third predetermined voltage). For this reason, in the case that the intermediate voltage Vx is a high voltage for a short period of time, the FET 14 is not turned on. As a result, it is possible to suppress a malfunction occurring due to a noise and the like.

Figure 13:
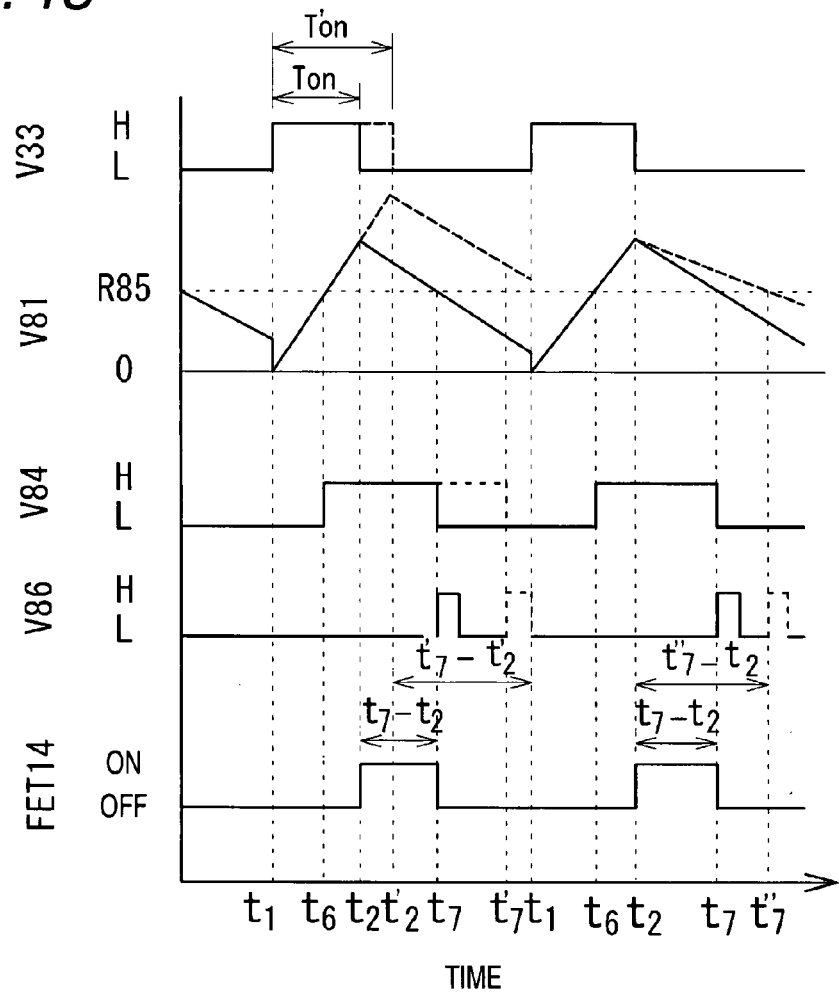
FIG. 13 is a timing chart of the second timing circuit according to the second embodiment.

FIG. 13 is a timing chart of the second timing circuit 80. Referring to FIGS. 7 and 13, the comparator 84 compares the output V81 with a reference voltage R85. If the output V81 of the timer circuit 81 is equal to or larger than the reference voltage R85, the comparator 82 outputs a high level as an output V84. The output V84 changes to a high level at time t6 of FIG. 13 and changes to a low level at time t7. When the output V48 changes to a low level, the shot circuit 86V48 outputs a high pulse to a reset R of the flip-flop 88. As a result, the flip-flop 88 outputs a low level, which turns off the FET 14. As shown by a dotted line of a pulse on a left side of FIG. 13, if a time Ton for which the FET 12 is in an ON state is longer than a time T'on, a time for which the FET 14 is in an ON state becomes longer from (t7-t2) to (t7'-t2'). Thus, the second timing circuit 80 decides a time, for which the FET 14 is in an ON state, corresponding to the ON time of the FET 12. For this reason, in the case when the ON time of the FET 12 is short, the ON time of the FET 14 becomes shorter. If the ON time of the FET 12 is short, the ON time of the FET 14 may be short. That is, in the case when the ON time of the FET 12 is short, it is possible to suppress a power loss occurring due to a current flowing through the FET 14.

Referring to FIG. 7, the power supply voltage VB is input to the timer circuit 81, and a slope of a uniform decrease in output V85 from time t2 to time t1 changes according to the power supply voltage VB. As shown by a dotted line of a pulse on a right side of FIG. 13, if the slope of a uniform decrease in output V85 is changed, a time for which the FET 14 is in an ON state can be changed from (t7-t2) to (t7"-t2). Thus, the second timing circuit 80 can decide the time for which the FET 14 is in an ON state in accordance with the power supply voltage VB. In a case where the power supply voltage VB is high, it is possible to suppress a power loss, which occurs due to a current flowing through the FET 14, by making the ON time of the FET 14 long.

In addition to functions in the first embodiment, all functions in the second embodiment may not be provided but each of the functions may be individually provided in the first embodiment. Furthermore the first timing circuit 70 and the second timing circuit 80 are not limited to circuits in the second embodiment as long as the first timing circuit 70 and the second timing circuit 80 have the functions described above.

Third Embodiment

Figure 14:
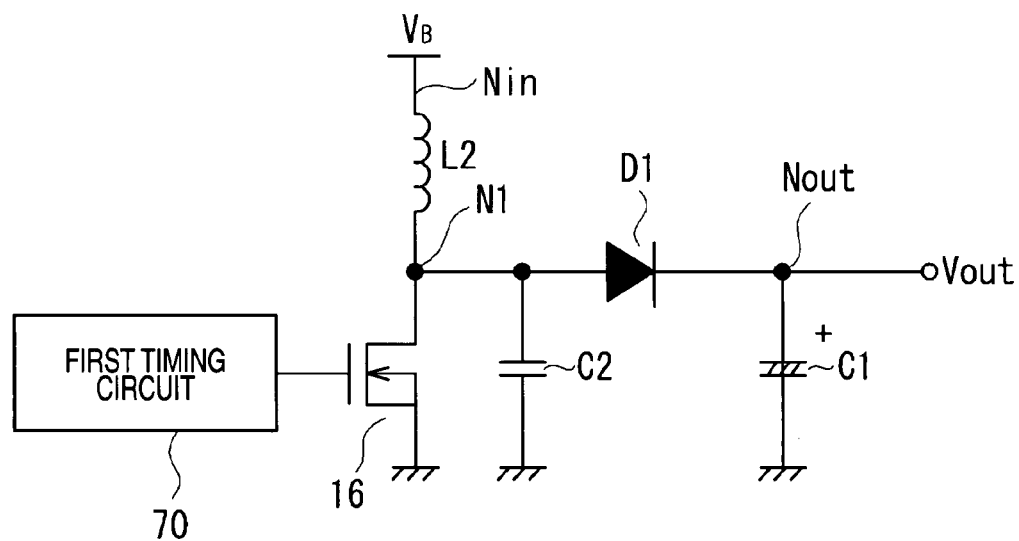
FIG. 14 is a circuit diagram illustrating a converter according to a third embodiment of the present invention.
Figure 15:
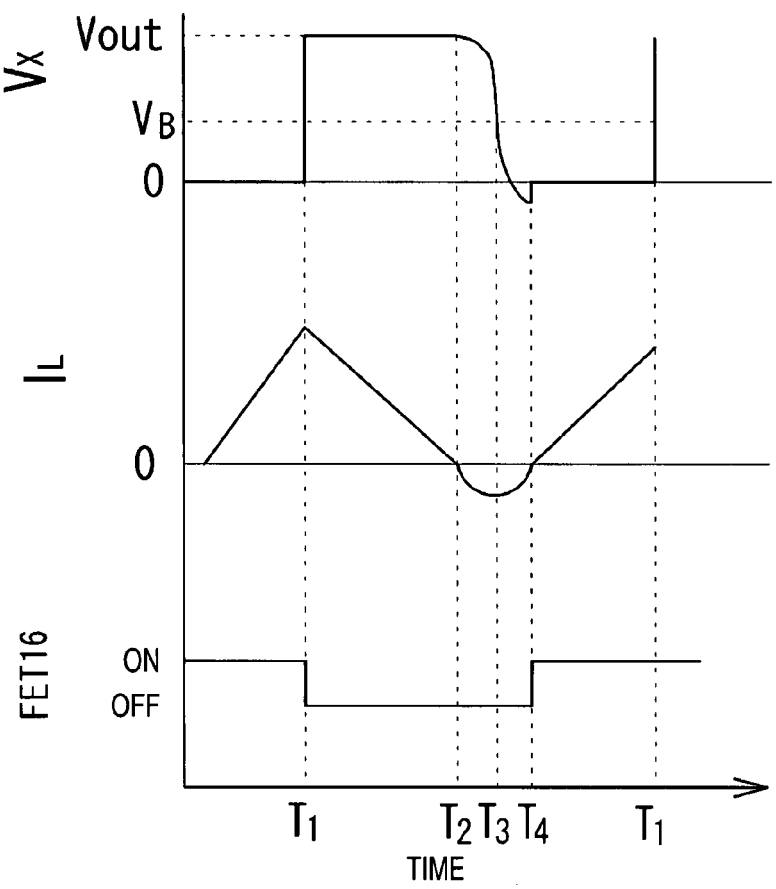
FIG. 15 is a timing chart of the converter according to the third embodiment.

In a third embodiment, an example of a step-up converter will be described. FIG. 14 is a circuit diagram illustrating a power supply device (converter) according to the third embodiment, and FIG. 15 is a timing chart of the power supply device. Referring to FIG. 14, an inductor L2 is connected between an intermediate node N1 and an input node Nin to which a power supply voltage VB is input. An FET 16 and a capacitor C2 are connected between the intermediate node N1 and a ground. A diode D1 is connected in a forward direction from the intermediate node N1 to an output node Nout. A capacitor C1 is connected between the output node Nout and a ground. A first timing circuit 70 is connected to a gate of the FET 16.

Referring to FIG. 15, when the FET 16 is turned off at time T1, an intermediate voltage Vx changes to an output voltage Vout, which is higher than the power supply voltage VB, due to an inductor current IL flowing through the inductor L2. When the inductor current IL decreases and becomes zero at time T2, the inductor current IL resonates by means of the inductor L2 and the capacitors C2 and C1, and thus the inductor current IL flows in a reverse direction. At time T4 after time (T4-T3) corresponding to ¼ of a resonance period has passed from time T3 at which the intermediate voltage Vx became the power supply voltage VB, the first timing circuit 70 turns on the FET 16. Thus, the FET 16 is turned on when the inductor current IL is 0. That is, a zero current switching is performed. As described above, even in the step-up converter, the zero current switching can be performed.

Fourth Embodiment

Figure 16:
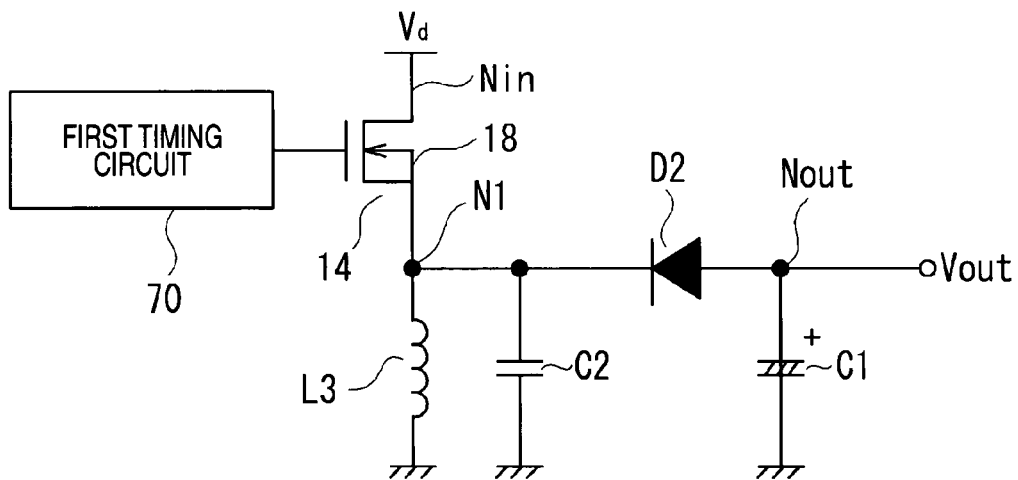
FIG. 16 is a circuit diagram illustrating a converter according to a fourth embodiment.
Figure 17:
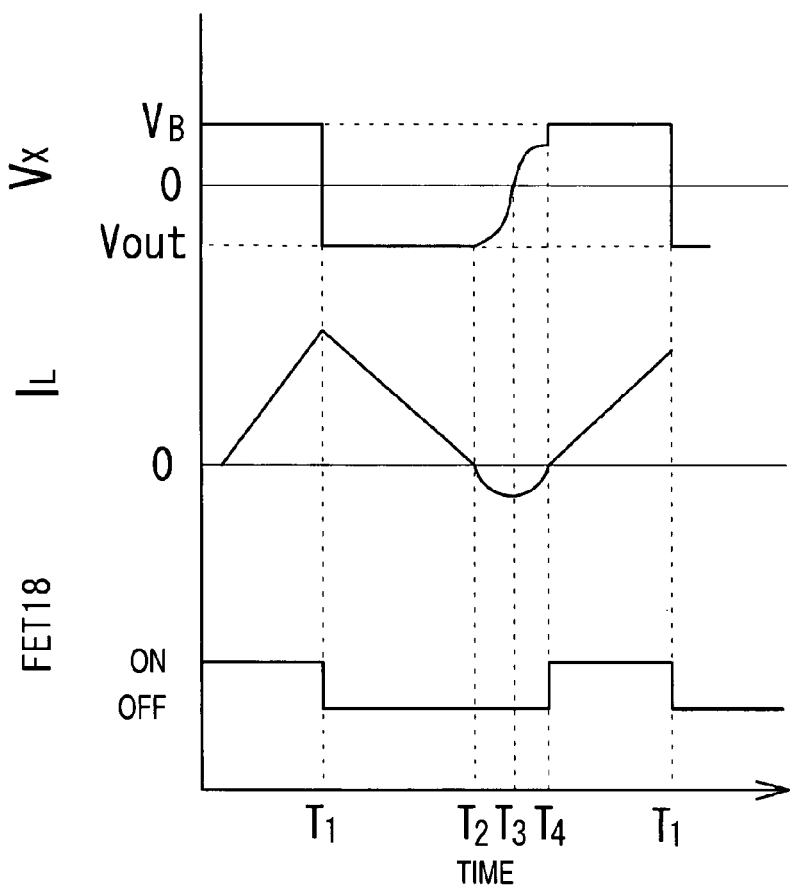
FIG. 17 is a timing chart of the converter according to the fourth embodiment.

In a fourth embodiment, an example of an inverting converter will be described. FIG. 16 is a circuit diagram illustrating a power supply device (converter) according to the fourth embodiment, and FIG. 17 is a timing chart of the power supply device. Referring to FIG. 16, an FET 18 is connected between an intermediate node N1 and an input node Nin to which a power supply voltage VB is input. An inductor L3 and a capacitor C2 are connected in parallel between the intermediate node N1 and a ground. A diode D2 is connected in a reverse direction from the intermediate node N1 to an output node Nout. A capacitor C1 is connected between the output node Nout and a ground.

Referring to FIG. 17, when the FET 18 is turned off at time T1, an intermediate voltage Vx changes to an output voltage Vout, which is lower than 0 V, due to an inductor current IL flowing through an inductor L3. When the inductor current IL decreases and becomes zero at time T2, the inductor current IL resonates by means of the inductor L3 and the capacitors C2 and C1, and thus the inductor current IL flows in the reverse direction. At time T4 after time (T4-T3) corresponding to ¼ of a resonance period has passed from time T3 at which the intermediate voltage Vx became zero, the first timing circuit 70 turns on the FET 18. Thus, the FET 18 is turned on when the inductor current IL is 0. That is, a zero current switching is performed. As described above, even in the inverting converter, the zero current switching can be performed.

According to the first to fourth embodiments described above, the electric potential at the intermediate node N1 can be reliably set to a ground or the power supply voltage VB by causing the FET 12, 16 or 18 (first switching circuit) to be turned on. The resonance circuit configured to include the inductor L1, L2 or L3 and the capacitors C1 and C2 causes the intermediate voltage to resonate. In addition, when the intermediate voltage Vx becomes the output voltage Vout, an input voltage Vin, or 0 V (first predetermined voltage), the first timing circuit 70 turns on the FET 12, 16 or 18 after a predetermined time (for example, time obtained by adding integral multiples of a resonance period to a time corresponding to ¼ of the resonance period). Then, the power supply voltage VB (input voltage) is converted into the output voltage Vout through the intermediate voltage Vx. Thus, the zero current switching is performed.

In the case of the step-up converter, unless the output voltage Vout is twice or more the power supply voltage VB, the intermediate voltage Vx does not become 0 V. Accordingly, the zero voltage switching cannot be performed. Further, in the case of the inverting converter, unless the output voltage Vout is larger than the power supply voltage VB, the intermediate voltage Vx does not become the power supply voltage VB. Accordingly, the zero voltage switching cannot be performed. According to the third and fourth embodiments described above, since a zero current switching is performed even when the zero voltage switching cannot be performed, a power loss can be suppressed.

Fifth Embodiment

Figure 18:
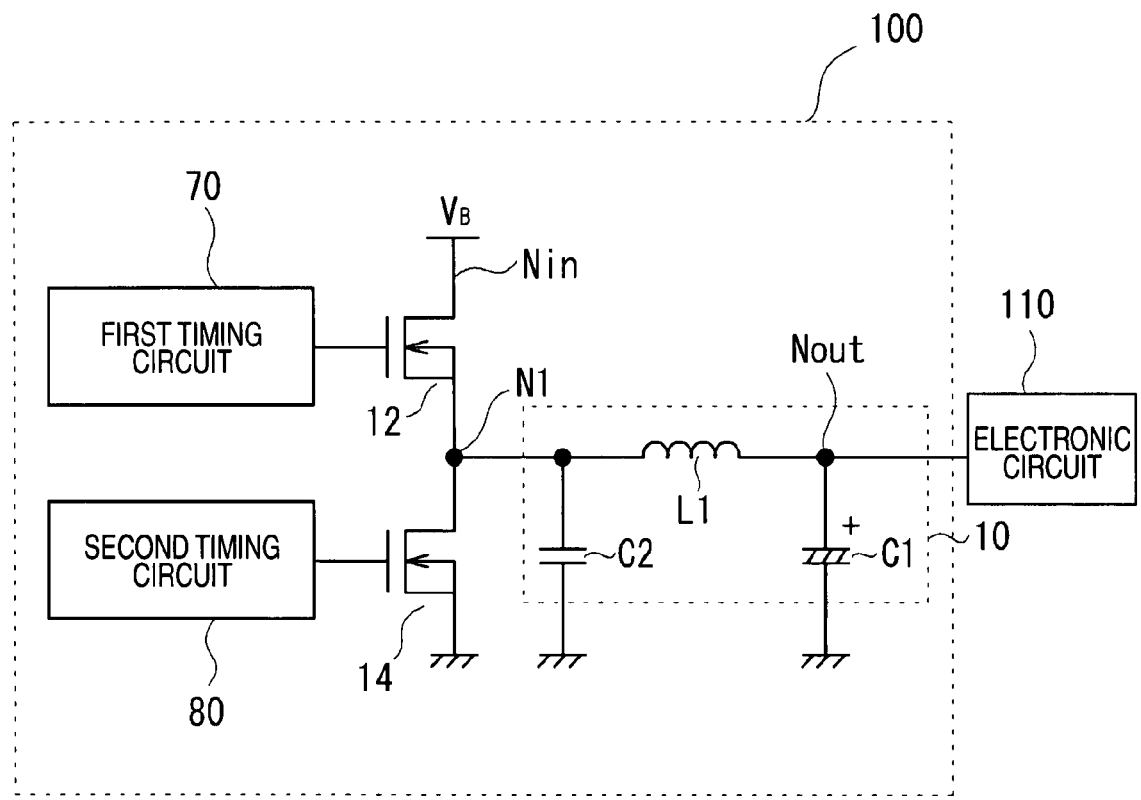
FIG. 18 is a block diagram illustrating an electronic apparatus according to a fifth embodiment.

In a fifth embodiment, an example of an electronic apparatus using the converter according to the first embodiment will be described. Referring to FIG. 18, an output of a converter 100 according to the first embodiment is connected to an electronic circuit 110. The converter 100 (power supply device) supplies electric power to the electronic circuit 110. According to the fifth embodiment, it is possible to realize an electronic apparatus in which a power loss is small. As a converter, the converters according to the second to fourth embodiments may also be used.

In the first to fourth embodiments, the n-type MOSFETs 12 and 14 have been used as the first and second switching circuits. However, other switching circuits may also be used. In addition, a parasitic capacitance, such as an FET, can also be used as the capacitor C2.

Having described the embodiments of the invention in detail, it should be understood that the invention is not limited to those specific embodiments but various changes and modifications thereof could be made without departing from the spirit and scope of the invention as defined in the appended claims.

What is claimed is:

1. A control unit operable to control a power supply device that includes a first node to which an input voltage is input, a second node, a third node from which an output voltage is output, a first switching circuit electrically connecting the first node and the second node and a resonance circuit electrically connecting the second node and the third node and that converts the input voltage into the output voltage through an intermediate voltage of the second node, the control unit comprising:

a first timing circuit operable to turn on and turn off the first switching circuit,
 wherein when the intermediate voltage becomes equal to or larger than a first predetermined voltage, the first timing circuit turns on the first switching circuit after a first predetermined time period.

2. The control unit as set forth in claim 1, wherein:
 the first switching circuit includes a field effect transistor; and
 the first timing circuit is electrically connected to a gate of the field effect transistor.

3. The control unit as set forth in claim 1, wherein the resonance circuit includes an inductor and a capacitor.

4. The control unit as set forth in claim 1, wherein the first predetermined voltage is any one of the output voltage, the input voltage, and a ground voltage.

5. The control unit as set forth in claim 1, wherein the predetermined time period is a time corresponding to $(N+\frac{1}{4})$ times resonance period of the resonance circuit (where N is 0 or positive integer).

6. The control unit as set forth in claim 1, wherein when the output voltage is smaller than a second predetermined voltage and the intermediate voltage becomes equal to or larger than the first predetermined voltage, the first timing circuit turns on the first switching circuit after the first predetermined time period.

7. The control unit as set forth in claim 1, wherein when the intermediate voltage does not become equal to or larger than the first predetermined voltage for a second predetermined time period, the first timing circuit turns on the first switching circuit.

8. The control unit as set forth in claim 1, wherein when a current flowing through the first switching circuit becomes equal to or larger than a predetermined current, the first timing circuit turns off the first switching circuit.

9. The control unit as set forth in claim 1, wherein the first timing circuit adjusts the first predetermined time period in response to an ON/OFF period of the first switching circuit.

10. The control unit as set forth in claim 9, wherein:
    the first timing circuit shortens the first predetermined time period when the ON/OFF period of the first switching circuit is longer than a reference period; and
    the first timing circuit elongates the first predetermined time period when the ON/OFF period of the first switching circuit is shorter than the reference period.

11. The control unit as set forth in claim 1, wherein:
    the power supply device further includes a second switching circuit electrically connecting the second node and a ground;
    the control unit further comprises a second timing circuit operable to turn on and turn off the second switching circuit; and
    when the intermediate voltage is equal to or smaller than a third predetermined voltage, the second timing circuit turns on the second switching circuit.

12. The control unit as set forth in claim 11, wherein when the first switching circuit is turned on for a third predetermined time period and the intermediate voltage is equal to or smaller than the third predetermined voltage, the second timing circuit turns on the second switching circuit.

13. The control unit as set forth in claim 11, wherein the second timing circuit determines a time period for which the second switching circuit is turned on in response to a time period for which the first switching circuit is turned on.

14. The control unit as set forth in claim 11, wherein the second timing circuit determines a time period for which the second switching circuit is turned on in response to the input voltage.

15. An electronic apparatus, comprising:
    an electronic circuit; and
    the power supply device as set forth in claim 14 that supplies power to the electronic circuit.

16. A power supply device, comprising:
    a first node to which an input voltage is input;
    a second node;
    a third node from which an output voltage is output;
    a first switching circuit electrically connecting the first node and the second node;
    a resonance circuit electrically connecting the second node and the third node; and
    the control unit including a first circuit operable to turn on and turn off the first switching circuit, wherein:
    the power supply device operable to convert the input voltage into the output voltage through an intermediate voltage of the second node; and
    when the intermediate voltage becomes equal to or larger than a first predetermined voltage, the first timing circuit turns on the first switching circuit after a first predetermined time period.

17. A method for controlling a power supply device that includes a first node to which an input voltage is input, a second node, a third node from which an output voltage is output, a switching circuit electrically connecting the first node and the second node and a resonance circuit electrically connecting the second node and the third node, and that converts the input voltage into the output voltage through an intermediate voltage of the second node, the method comprising:
    determining whether the intermediate voltage becomes equal to or lager than a predetermined voltage;
    turning on the switching circuit after a predetermined time period when the intermediate voltage becomes equal to or larger than the predetermined voltage.

* * * * *